United States Patent [19]

Porter et al.

[11] Patent Number: 4,691,993
[45] Date of Patent: Sep. 8, 1987

[54] TRANSPARENT SHEETS CONTAINING DIRECTIONAL IMAGES AND METHOD FOR FORMING THE SAME

[75] Inventors: Gerald R. Porter, Burnsville; Thomas I. Bradshaw, Afton; Eric N. Hockert, Cottage Grove, all of Minn.

[73] Assignee: Minnesota Mining and Manufacturing Company, St. Paul, Minn.

[21] Appl. No.: 733,066

[22] Filed: May 13, 1985

[51] Int. Cl.[4] .................................. G02B 5/128
[52] U.S. Cl. ....................................... 350/105
[58] Field of Search ........................... 350/105

[56] References Cited

U.S. PATENT DOCUMENTS

| | | | |
|---|---|---|---|
| 3,154,872 | 11/1964 | Nordgren | 40/135 |
| 3,503,315 | 3/1970 | de Montebello | 95/18 |
| 3,801,183 | 4/1974 | Seveliu et al. | 350/105 |
| 4,082,426 | 4/1978 | Brown | 350/105 |
| 4,099,838 | 7/1978 | Cook et al. | 350/105 |
| 4,200,875 | 4/1980 | Galanos | 346/1.1 |

FOREIGN PATENT DOCUMENTS 59-148004  8/1984  Japan.

Primary Examiner—John K. Corbin
Assistant Examiner—Vincent J. Lemmo
Attorney, Agent, or Firm—Donald M. Sell; James A. Smith; Robert H. Jordan

[57] ABSTRACT

A directional image is created in transparent sheeting comprising a monolayer of microlenses by forming deformations in at least some of the microlenses by irradiation with a laser beam which has a short pulse duration. The directional images may be formed in transparent sheeting which has been applied to a document as an overlay. When viewed under diffuse lighting conditions, the deformations appear as a dark image. The deformations may be formed so that when viewed under retroreflective conditions within a conical field the image is darker than the surrounding background, and when viewed under retroreflective conditions outside the conical field the image is brighter than the surrounding background.

15 Claims, 6 Drawing Figures

TRANSPARENT SHEETS CONTAINING DIRECTIONAL IMAGES AND METHOD FOR FORMING THE SAME

FIELD OF INVENTION

This invention concerns a substantially transparent sheet which contains a directional image (a "directional image" is viewable only within a restricted conical field of view of predetermined angular width and central axis). This invention also concerns a method for forming such sheets.

BACKGROUND ART

Sheeting in which an image of a pattern or legend is built has found a number of important uses, particularly as distinctive labels useful to authenticate an article or document. Such sheeting has found use as validation stickers for vehicle license plates and as security films for driver's licenses, government documents, phonograph records, tape cassettes, and the like, as taught in U.S. Pat. Nos. 3,154,872; 3,801,183; 4,082,426; and 4,099,838. In each of the patents, the built-in images must be incorporated into the sheeting while the sheeting is being constructed.

Sevelin et al., U.S. Pat. No. 3,801,183, discloses a substantially transparent sheeting to be used as an overlay on a document such as a credit card, a pass, a license or phonograph label to serve as an identifying or authenticating means. The sheet is retroreflective over its entire surface area and contains a retroreflecting pattern or legend which is obscure in that it is invisible or only faintly visible to the naked eye under diffuse light and does not obstruct any underlying visual information.

Nordgren, U.S. Pat. No. 3,154,872, and Brown, U.S. Pat. No. 4,082,426, teach other retroreflective sheets containing images that may be obscure, which sheets can be adhesively bonded to documents to make counterfeiting more difficult. The imaged sheets disclosed in those patents are not transparent, however, and so would obstruct information over which they were applied.

Other methods have been developed which use laser irradiation of a sheet material to form directional images therein. These methods rely on opaque masking layers to focus the laser light to a damage locus within a monolayer of microlenses, or to themselves absorb radiation and develop deformations which are viewable as a directional image. If a transparent sheet containing a directional image is desired, after formation of the visible deformations, the opaque masking must be removed.

Galanos, U.S. Pat. No. 4,200,875, discloses a method of forming directional images in opaque retroreflective sheeting which comprises a specular reflecting layer disposed behind a monolayer of glass microspheres. In that method, laser irradiation of the retroreflective sheeting in an imagewise fashion causes structural alterations or modifications in the sheet which are viewable as directional images. Because the Galanos sheeting is opaque, it would obstruct underlying information if adhered to a document as an overlay.

Hockert et al., Jap. Appln. No. 19824/84, filed Feb. 6, 1984, Kokai No. 148004/84, laid open Aug. 24, 1984, forms a directional image in sheeting which comprises a monolayer of microlenses, a masking layer disposed behind the monolayer of microlenses, and a transparent spacing layer located between those two layers. Laser irradiation of the sheeting forms openings in the masking layer which are visible as a directional image. By coloring the transparent spacer layer through the openings and then removing the masking layer, such as with a chemical etch, one can obtain a transparent sheet containing a directional image. The sheet may then be adhered to a document as an overlay which provides a secure means of authenticating the document without interfering with the normal use of the information contained thereon.

SUMMARY OF INVENTION

This invention provides a method whereby directional images may be directly formed in transparent sheeting, and further provides novel sheets made according to the new method. By the present invention, directional images may even be formed in transparent sheeting that has already been applied as an overlay on a document such as a driver's license or passport. Because the images are directional, they may be formed so as to not interfere with reading the underlying information through the overlying sheet. The directional images formed according to this method are viewable both under diffuse light and under retroreflective conditions.

Briefly the novel method comprises directing a laser beam with a short pulse duration in an imagewise fashion at a selected angle of incidence to the face of the sheeting. The wavelength of the laser beam is selected such that it is focused by microlenses to form a deformation at the rear of each microlens which the beam strikes. These deformations may be termed "axial markings", in that the deformation in each microlens is centered on an axis that extends through the optical center of the microlens and is parallel to, or intersects at a common viewing point or line, the similar axes for the other deformed microlenses in the image area. The resulting set of deformations is visible as an image at the angle of incidence of the imaging laser beam.

Preferably the novel method of this invention employs a laser which has a short pulse duration (less than 50 nanoseconds), and sufficient power to cause the deformation of each of the microlenses which the laser beam strikes. Typically in the case of glass microlenses, a laser with a pulse duration of about 10 nanoseconds adjusted so as to provide a power density of approximately one megawatt per square centimeter at the sheeting's surface is useful. Suitable lasers include pulsed, electro-optically Q-switched Nd:YAG (Neodymium: Yttrium Aluminum Garnet) lasers, such as the "Quanta-Ray DCR-2 Nd:YAG Laboratory Laser System" available from Spectra-Physics, Inc. of San Jose, Calif.

The sheet product produced by the foregoing method is believed to be novel. It is substantially transparent and comprises a monolayer of microlenses, there being a deformation at the rear of at least some of the microlenses. The set of deformations is viewable as an image across a predetermined conical field of view in ordinary diffuse light. Microscopic studies of the novel sheet reveal that each deformation typically is a cavity which may open through the rear wall of the microlens.

DETAILED DESCRIPTION

The microlenses of sheeting to be imaged according to the novel method are preferably spherical because they may be imaged from virtually any angle of incidence, and if the sheeting is retroreflective, it will be retroreflective over a wide range of angles. Microlenses with different geometries may be restricted to narrower angles of effectiveness. An example of sheeting comprising nonspherical microlenses is disclosed in de Montebello, U.S. Pat. No. 3,503,315. Glass microlenses are preferred because they tend to be more durable than microlenses formed from other materials.

Microspheres with a refractive index within a range of 1.5 to 2.7 are useful. However, microspheres with refractive indices above 2.4 may introduce coloring, whereas colorless clarity is usually preferred so that the sheet may be as unobtrusive as possible when applied to a document as an authenticating means. Microspheres with a refractive index of approximately 1.8 to 1.9 are preferred because they will focus white light at approximately the back surface of the microsphere. Light in the infrared region will be focused to an area slightly behind where white light is focused.

The glass microspheres preferably have an average diameter of 10 to 100 micrometers, and are ideally of a uniform diameter of approximately 50-60 micrometers. If the microspheres are much larger, the sheeting tends to become thicker and more expensive to make, and images formed thereon will have less resolution. If the microspheres are much smaller, images formed on the sheeting will have greater resolution, but it is more difficult to uniformly distribute the microlenses when constructing the sheet, and the images formed thereon are less bright because of diffraction losses.

Each microlens focuses the laser light incident upon it to a small spot to create a localized deformation in the microlens. The resulting set of deformations is visible within a conical field of view whose central axis is determined by the angle of incidence at which the imaging beam is directed to the sheeting. The angular width of the conical field of view is related to the size of the deformations. Larger deformations are visible as an image across a wider field of view than are smaller deformations. The size of a deformation is determined by the energy density of the irradiation applied to the sheeting which creates the deformation. If a beam with a higher energy density is used to form the deformations, the image will have a wider conical field of view. Similarly, if a beam with a lower energy density is used, the image will have a narrower conical field of view.

When forming images in sheeting which comprises a monolayer of the preferred glass microspheres having an average diameter of approximately 50-60 micrometers, the laser beam is preferably adjusted to form deformations or axial markings having diameters within a range from 1 to 20 micrometers. When the microlenses are substantially all about 50-60 micrometers in diameter and the average diameter of the deformations is from 3 to 10 micrometers, each authenticating image is viewable under ordinary diffuse lighting conditions only across a cone of about 10 to 20 degrees. Larger deformations are viewable within larger conical fields of view, however, there would seldom be any reason for a directional image to be visible across a cone exceeding 30 degrees. On the other hand, a directional image which was viewable only across a cone of less than six to eight degrees might be difficult to locate.

In addition to a monolayer of microlenses, a sheet to be imaged according to the novel method may further comprise a semi-transparent, or partially light transmissive, dielectric mirror which reflects a portion of, and transmits another portion of, the light incident upon the microlenses. Such dielectric mirrors are taught in Sevelin, wherein it is also taught to form such mirrors with at least two regions of different retroreflective efficiency, one a legend-defining area and the other a background-defining area, so as to form transparent sheeting containing legends which are obscure (i.e., invisible or only faintly visible to the naked eye) under diffuse light but are readily visible under retroreflective lighting conditions. The novel method may be performed on such sheeting to provide a sheet which contains both the obscure or latent retroreflective legend disclosed by Sevelin and the directional images of this invention.

The laser radiation may be directed to the sheet in a pattern, such as through a mask, to form deformations at the rear of only a selected portion of the microlenses, or it may be applied uniformly over the whole surface of the sheeting. A sheet is regarded as "imaged" according to this invention whether it is prepared with selectively patterned or with whole-surface radiation, since in either case the sheet has a visibly distinctive appearance at certain angles of viewing and under certain lighting conditions.

A sheet bearing two directional images may be formed, if after directing a suitable laser beam in an imagewise fashion at a sheet at a first selected angle of incidence, such a laser beam is directed in imagewise fashion at the sheet at a different selected angle of incidence thereby forming two sets of deformations. Further repetitions of the step may be performed to provide a sheet of the invention with more than two images. The angles of incidence selected may be spaced sufficiently far apart that the respective conical fields of view of the different images will not overlap or interfere with each other.

The novel method may also lead to other unique and unexpected visual effects. The set of deformations formed in the microlenses by the laser beam are generally visible under ordinary diffuse lighting conditions within a conical field of view as a dark image or pattern. When viewed retroreflectively within that conical field of view, the set of deformations is visible as an image which is darker than the surrounding retroreflecting background. However, when viewed retroreflectively at an angle somewhat outside that conical field of view, the set of deformations is visible as an image which is brighter than the surrounding retroreflecting background.

The precise cause of the bright retroreflectivity of the set of deformations is not fully understood, but may be due in part to the cracks which some deformations were observed to comprise. Microscopic studies reveal that the cracks, typically from three to five in number, extend radially from a central locus. The locus appears to be a cavity formed within the microlens that in some instances opens through the back of the microlens. FIGS. 4-6 and the associated description thereof contain a description of the radial cracks.

The mechanism by which these radial cracks are formed is not fully understood, but one possible explanation is that because the imaging laser beam has a short pulse width, the microlenses are heated so rapidly that they crack as well as form cavities when irradiated. Another possible explanation for the formation of the cracks is that the electromagnetic field associated with the imaging laser beam has a high peak flux density that exceeds the dielectric breakdown value of the microlenses.

Because the sheets formed according to the novel method are transparent, they can easily be adapted to be adhesively bonded over the information areas of a document. Strong transparent adhesives are available which will bond so firmly to a document that the overlying sheet cannot be removed without visibly damaging the document and sheet, thereby making the overlays a secure means for authenticating a document to which they might be attached. In one embodiment, as an authenticating device for instance, the image may be made so as to be visible at an angle at which a document is not normally viewed so as not to interfere appreciably with the legibility of the underlying information such as written or printed matter or a photograph. When placed as an overlay directly on the information bearing portion of a document, a driver's license for instance, the sheet prevents tampering with the information and provides a secure form of authentication that does not interfere with the normal use of the document. In another embodiment, the image may be made so as to be visible at an angle at which a document is normally viewed to ensure that the image is brought to a reader's attention.

An advantage of this invention is that a transparent sheet which has already been adhered as an overlay may have a directional image formed therein. This capability allows the information borne by an overlay to be updated and makes more convenient the formation of a limited number of sheets with a particular image contained therein. For instance, a driver's license which had been originally issued with a sheet of the invention applied as an overlay as a means of authentication might have a special message, such as a restriction to corrective lenses, incorporated therein at a later date. The restriction can be incorporated in the existing license, thereby avoiding the expense and delay of issuing a replacement. The newly added information will achieve the same degree of security as the images originally contained therein.

Transparent sheets bearing directional images have many uses, most notably as authenticating images or overlays used to ensure that documents, products, or any articles to which they might be attached are genuine. Such sheets can be used by manufacturers or sellers of name brand products to prevent passing off of counterfeit products. The ability to make sheets bearing multiple images further increases this utility. An advantage of the sheets of this invention is the difficulty of removing or tampering with the image without destroying the structural integrity of the sheet. Further, duplicating or reproducing the images would be difficult without expensive and sophisticated equipment and know-how.

Possible uses for sheets imaged according to this invention include driver's licenses, passports, bank cards, credit cards, and identification cards. Other applications wherein the novel sheet or method of this invention may be useful will be obvious to those skilled in the art.

DESCRIPTION OF DRAWINGS

FIG. 1 shows a substantially transparent sheet comprising a monolayer of microlenses 2 which are partially embedded in a transparent polymeric binder 4. The embodiment shown is adapted to be bonded to a document or article with a transparent adhesive 6. According to the method, a laser beam 10 which has a short pulse duration is directed to the sheet in an imagewise fashion at an incident angle $\theta$. The laser beam incident upon a microlens is focused at location 8 thereby forming a deformation in each microlens which the beam strikes. The set of deformations thus formed is disposed such that it is visible as a directional image 12.

FIG. 2 shows a substantially transparent retroreflective sheet comprising a monolayer of microlenses 2 and a semi-transparent dielectric mirror 14 which reflects a portion of, and transmits another portion of, the light passing through the outer surface of the microlenses. A discontinuous spacing layer 16, such as a varnish layer, changes the retroreflective effeciency of the dielectric mirror 14 to form an obscure retroreflectively viewable image 18 as taught in Sevelin. A directional image 12 may be formed in such a sheeting according to this invention by the irradiation at an incident angle $\theta$ with a laser beam 10 which has a short pulse duration.

FIG. 3 shows another embodiment of a substantially transparent retroreflective sheet imaged according to this invention in which the monolayer of microlenses 2 is embedded in a permanent transparent covering 24. The obscure retroreflectively viewable image 18 is provided by the different retroreflective efficiency of the continuous semi-transparent dielectric mirror 20 and discontinuous semi-transparent dielectric mirror 22. Such sheetings are also taught in Sevelin. A directional image 12 may be formed in such a sheeting according to this invention by the laser irradiation at an incident angle $\theta$ with a laser beam 10 which has a short pulse duration.

The schematic drawings are not literal section views, e.g. since each circle represents a full circumference as though the microspheres were of uniform diameter and arranged in uniform rows.

Figure 1:
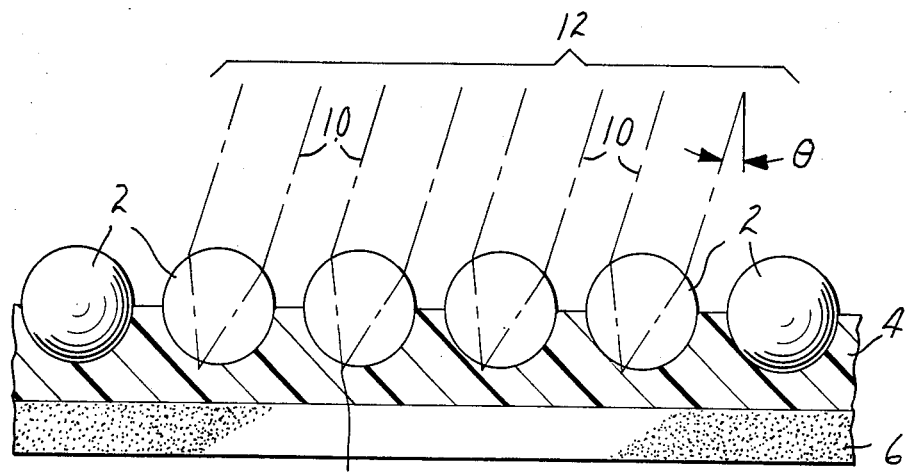
FIGS. 1-3 are schematic sections through fragments of sheets with different embodiments which are examples of some of the sheets which may be imaged according to this invention.
Figure 2:
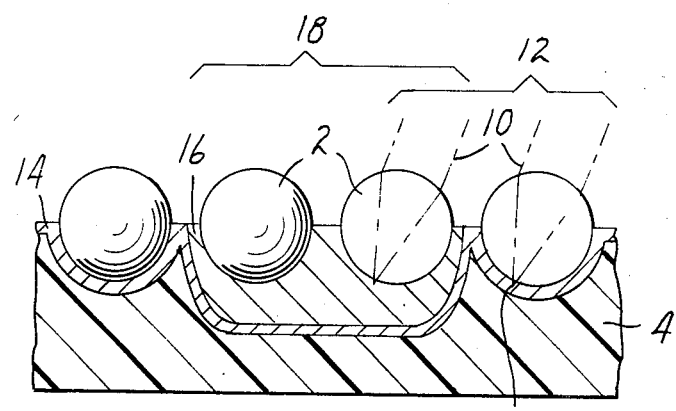
Figure 3:
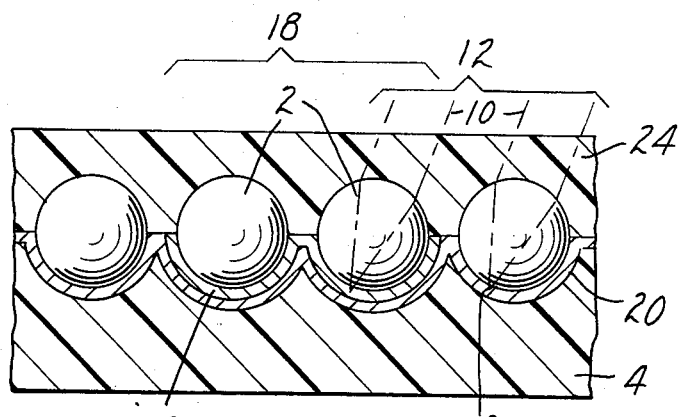
Figure 4:
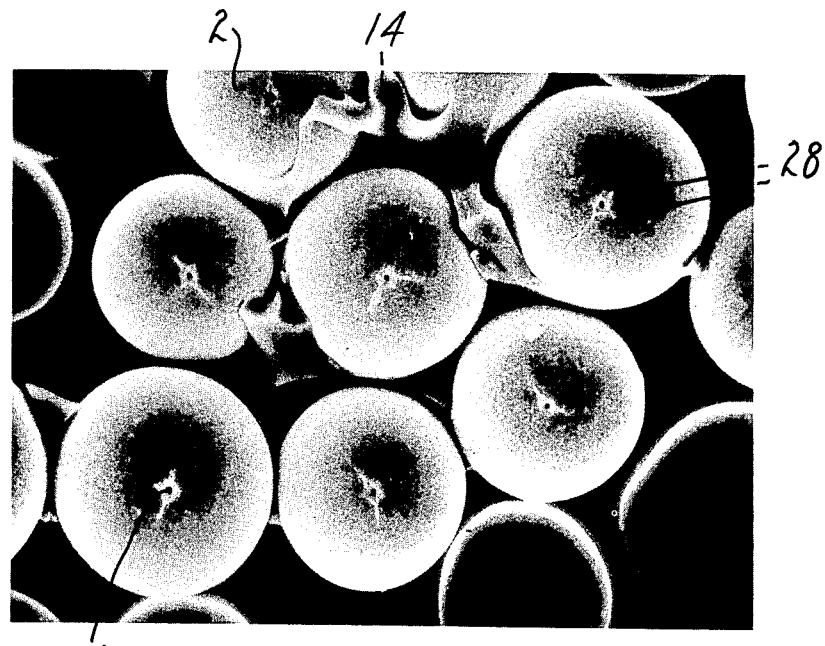
FIGS. 4-6 are photomicrographs showing the deformations formed according to this invention in preferred sheets comprising spherical glass microlenses.

FIG. 4 is a photomicrograph of the back sides of some microlenses in a retroreflective sheeting as shown in FIG. 2 which was directionally imaged at an incident angle $\theta$ of approximately 0°, i.e., normal to the surface of the sheeting. The photomicrograph is at a magnification of approximately 620X. After the image was formed, an epoxy resin was cured in contact with the exposed microlenses and then the polymeric binder and dielectric layer were removed to expose the back sides of the microlenses. Some remaining portions of the dielectric layer 14 can be seen around the central microlens. The deformations formed in the microlenses by the laser beam are clearly visible. Each deformation can be seen to be an opening 26 in the back of a microlens and a set of cracks 28 extending radially therefrom.

Figures 5, 6:
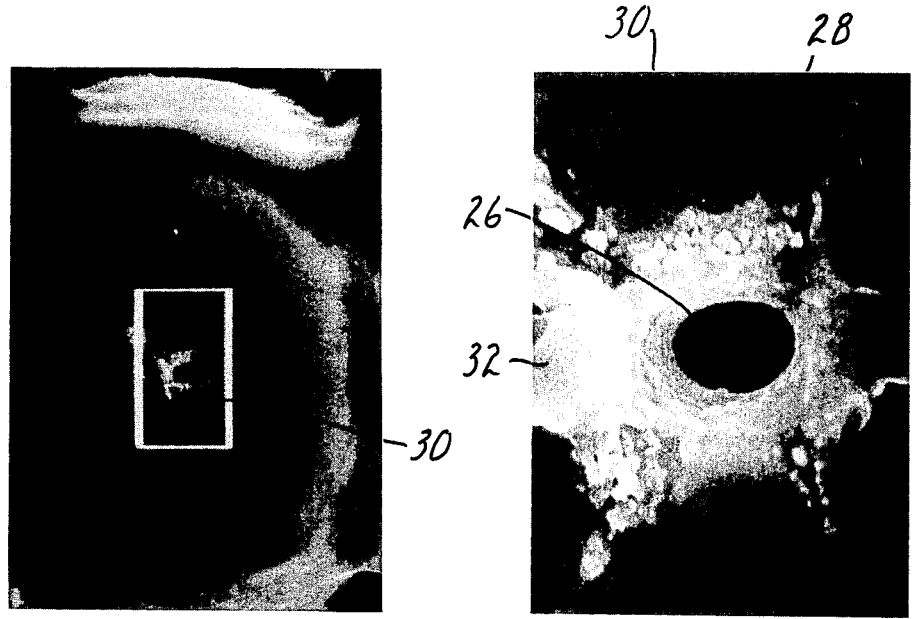

FIG. 5 is a photomicrograph of a single microlens similarly prepared as in FIG. 4 shown at a magnification of approximately 1290X.

FIG. 6 is a photomicrograph of the area 30 shown in FIG. 5 at a magnification of approximately 6450X. The deformation can be clearly seen to comprise a cavity 26 opening through the back of the microlens from within, a set of cracks 28 extending radially from the cavity, and an area that has the appearance of molten glass flow 32.

EXAMPLE

This invention will now be more specifically described by the following nonlimiting example. In this example a mask was laid atop the surface of a piece of sheeting which was to be imaged, and a laser beam was directed through the mask to the sheeting. The mask was used to block portions of the beam thereby causing the underlying sheeting to be irradiated in an imagewise fashion.

The sheeting which was imaged was a piece of "CONFIRM" Brand Security Film manufactured by the Minnesota Mining and Manufacturing Company of St. Paul, Minn. The sheeting comprised a monolayer of glass microspheres with a partially light transmissive dielectric mirror disposed on the underside of the microspheres. Such sheeting is disclosed in Sevelin et al., U.S. Pat. No. 3,801,183.

The mask comprised a transparent sheet of polyester, approximately 0.175 millimeters thick, and an opaque aluminum vapor coat thereon. The vapor coat covered only a portion of the polyester sheet, defining a bare, hence transparent, region in the shape of a "3M" logo.

The laser used was a Quanta Ray Model DCR-2A (30) Neodymium: Yttrium Aluminum Garnet (Nd:YAG) pulsed, Q-switched laser. The laser emitted a beam with a wavelength of 1064 nanometers in pulses of 0.7 joules with a pulse duration of approximately 10 nanoseconds. The output beam had a diameter of approximately 0.64 centimeters which was expanded to approximately 4.7 centimeters in diameter with a telescope-like lens assembly, thereby providing an average energy density of approximately 0.040 joules per square centimeter.

The mask was laid atop the piece of sheeting. The mask and sheeting were then irradiated with one pulse of the laser at an incidence angle of approxiamtely 30°.

The mask was then removed and the imaged sheet examined. In ordinary diffuse lighting, a dark image in the shape of "3M" was visible in a conical field of view centered at the incidence angle of the laser irradiation. Outside this conical field, which was approximately 10° wide, no image was visible. When viewed retroreflectively within the conical field of view, the "3M" was visible as an area darker than the surrounding background. When viewed retroreflectively at an angle somewhat outside the conical field of view, the image was visible as an area brighter than the surrounding background.

What is claimed is:

1. A method of forming directional images in substantially transparent sheeting comprising a monolayer of closely spaced microlenses, said method comprising directing a laser beam with a short pulse duration at a selected angle of incidence to the face of said sheeting, the wavelength of the laser being selected such that the beam is focused by the microlenses to form a deformation in the rear portion of each microlens which said beam strikes.

2. A method as defined in claim 1 wherein said microlenses are microspheres.

3. A method as defined in claim 2 wherein said microspheres are glass.

4. A method as defined in claim 2 wherein said microspheres have a refractive index of about 1.9.

5. A method as defined in claim 1 wherein said substantially transparent sheeting is retroreflective and further comprises a partially light transmissive mirror disposed at the rear surfaces of at least some of said microlenses.

6. A method as defined in claim 1 further comprising adapting said sheeting to be adhesively bonded over the information area of a document without appreciably interfering with the legibility of that information.

7. A method as defined in claim 6 wherein said laser beam is selected to form deformations which can be viewed as an image under diffuse light conditions only across a cone which has a width of about 6 to 20 degrees, and wherein said angle of incidence is appreciably different from angles at which documents are normally viewed.

8. A method as defined in claim 1 further comprising directing a laser beam with a short pulse duration at a second different selected angle of incidence to the face of said sheeting to form a second set of deformations, which set of deformations when viewed at said second selected angle of incidence appears as an image.

9. A method of forming directional images in substantially transparent sheeting comprising a monolayer of closely spaced microlenses, which sheeting has been adhesively bonded over the information area of a document without appreciably interfering with the legibility of that information, wherein said method comprises directing a laser beam with a short pulse duration at a selected angle of incidence to the face of said sheeting to form a deformation in the rear portion of each microlens which said beam strikes.

10. A substantially transparent sheet comprising a monolayer of microlenses, there being a deformation in the rear portion of at least some of the microlenses, which deformations together are viewable as an image across a predetermined conical field in ordinary diffuse light conditions.

11. A sheet as defined in claim 10 wherein the microlenses partially protrude from the front of the sheet.

12. A sheet as defined in claim 10 further comprising a partially light transmissive mirror disposed behind at least some of the microlenses and wherein said deformations comprise a set of radial cracks.

13. A sheet as defined in claim 12, wherein the microlenses and associated partially light transmissive mirror in a first, legend defining area have a different retroreflective efficiency than the microlenses and associated partially light transmissive mirror in a second, background defining area such that said sheet has retroreflective legend areas and retroreflective background areas, which areas are substantially indistinguishable under ordinary diffuse light viewing conditions, but are readily visually discernable from one another under retroreflective conditions.

14. A sheet as defined in claim 10 wherein when said sheet is viewed under retroreflective lighting conditions within a predetermined conical field of view said deformations appear darker than surrounding background areas and when viewed under retroreflective lighting conditions other than within said predetermined conical field of view said deformations appear brighter than said surrounding background areas.

15. A substantially transparent sheet comprising a monolayer of microlenses which partially protrude from the front of said sheet, at least some of the microlenses having a deformation in their embedded portion, which deformations together are viewable across a predetermined conical field of view in ordinary diffuse light as an image, and each said deformation being such that when said sheet is viewed under retroreflective lighting conditions within a predetermined conical field of view said deformations appear darker than surrounding background areas and when viewed under retroreflective lighting conditions other than within said predetermined conical field of view said deformations appear brighter than said surrounding background areas.

* * * * *